(12) United States Patent
Geary et al.

(10) Patent No.: US 8,075,023 B2
(45) Date of Patent: Dec. 13, 2011

(54) COUPLING FOR DRILLING-WITH-CASING OPERATIONS

(75) Inventors: George B. Geary, Houston, TX (US); Eugene J. Mannella, Richmond, TX (US)

(73) Assignee: GB Tubulars, Inc., Houston, TX (US)

( * ) Notice: Subject to any disclaimer, the term of this patent is extended or adjusted under 35 U.S.C. 154(b) by 0 days.

(21) Appl. No.: 12/020,844

(22) Filed: Jan. 28, 2008

(65) Prior Publication Data

US 2008/0179884 A1 Jul. 31, 2008

Related U.S. Application Data

(62) Division of application No. 11/117,990, filed on Apr. 29, 2005, now Pat. No. 7,347,459.

(60) Provisional application No. 60/567,031, filed on Apr. 30, 2004.

(51) Int. Cl.
*F16L 25/00* (2006.01)

(52) U.S. Cl. ........................... 285/333; 285/390

(58) Field of Classification Search .................. 285/383, 285/390, 333, 355
See application file for complete search history.

(56) References Cited

U.S. PATENT DOCUMENTS

| | | | |
|---|---|---|---|
| 2,262,211 A * | 11/1941 | Stone | 175/325.5 |
| 3,994,516 A | 11/1976 | Fredd | |
| 4,445,727 A | 5/1984 | Funk | |
| 4,522,431 A * | 6/1985 | Reimert | 285/334 |
| 4,588,213 A | 5/1986 | Bollfrass et al. | |
| 5,212,885 A | 5/1993 | Buonodono et al. | |
| RE34,467 E | 12/1993 | Reeves | |
| 6,582,126 B2 * | 6/2003 | North | 384/276 |
| 6,893,057 B2 | 5/2005 | Evans | |
| 2005/0011643 A1 | 1/2005 | Slack et al. | |

OTHER PUBLICATIONS

International Search Report dated Jul. 26, 2006 received in corresponding PCT International Application No. PCT/US05/15127.

* cited by examiner

*Primary Examiner* — Aaron Dunwoody
(74) *Attorney, Agent, or Firm* — Wong, Cabello, Lutsch, Rutherford & Brucculeri, L.L.P.

(57) ABSTRACT

A threaded casing connection for use in drilling-with-casing operations includes an integral, sacrificial wear sleeve on the downhole end of the coupling which has additional wear protection on portions of its outer wall and leading face.

4 Claims, 3 Drawing Sheets

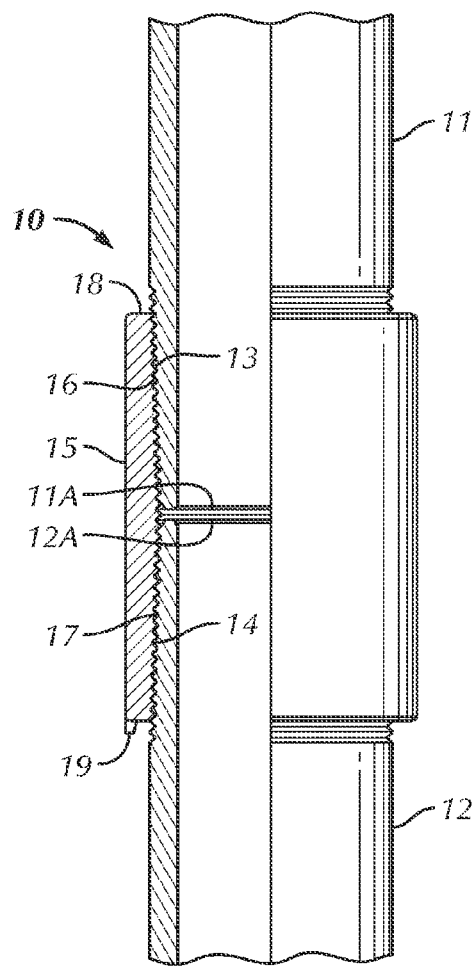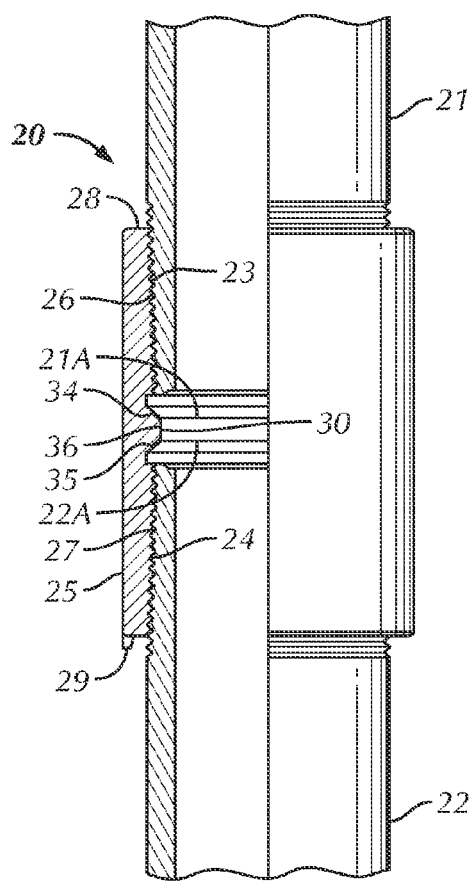
FIG. 1
FIG. 2

COUPLING FOR DRILLING-WITH-CASING OPERATIONS

CROSS-REFERENCE TO RELATED APPLICATIONS

This application is a divisional application of U.S. patent application Ser. No. 11/117,990 filed Apr. 29, 2005, now U.S. Pat. No. 7,347,459, which claims the benefit of U.S. Provisional Application No. 60/567,031 filed Apr. 30, 2004, the disclosure of which is hereby incorporated by reference in its entirety.

BACKGROUND OF THE INVENTION

1. Field of the Invention

The present invention relates generally to threaded API casing connections, but more specifically to the couplings for API Buttress threaded casing to be used as a combination drill string and casing string—i.e., Drilling With Casing (DWC).

2. Description of the Related Art

Presently the conventional method for drilling oil and gas wells is to use drill pipe specifically designed for and dedicated to drilling the well bore. Upon drilling a well to completion, the drill pipe is pulled from the well and transferred to the next location for drilling another well. The drill pipe is thus used until it is worn out. The open hole left by the drill pipe is sealed off by running a string of casing pipes to the bottom of the hole and cementing the casing string in place.

In contrast to the above procedure, it is the purpose of new technology to eliminate the use of the above-described drill pipe and instead use the casing string for both drilling the well and casing off the open hole. The procedure is commonly referred to as "Drilling With Casing" (DWC). This procedure has been tried in various parts of the world but with limited success. However DWC offers so much potential for reducing drilling costs that interest remains high throughout the industry and many new projects are aimed at advancing the technology.

In conventional casing usage, the casing and its connections are subjected only to static loads comprising tension, torsion, compression, bending, pressure and any combination thereof. In DWC usage, the casing and connections are not only subject to all of the above static loads, but also to dynamic loads due to rotating the casing at 100 to 150 RPM while drilling the well bore. As the casing rotates and advances down the well bore, the casing string and particularly the connections, which have a larger outside diameter than the casing, are subject to cyclic fatigue loads, severe abrasion wear and impact loading, then finally to all the static loads mentioned above after the casing is set and cemented in the well.

This invention is directed at one of the primary problems associated with DWC—the connections which join each length of casing, one to another. Experience to date with DWC has demonstrated a need for a more robust, yet economical casing connection to withstand the additional rigors of dynamic loading and frictional wear caused by rotating the string while drilling.

BRIEF SUMMARY OF THE INVENTION

The invention comprises the following modifications of the standard API Buttress threaded coupling only, while maintaining it's compatibility with standard API Buttress threaded Pins:

1. The coupling threads only are modified with multiple tapers to reduce and equalize makeup stresses through the thinner cross-sections of both the pins and coupling, thereby minimizing the possibilities of thread galling during connection assembly.
2. The multiple thread taper reduces the bearing stresses, and therefore the localized stress risers in the run-out pin threads where the connections commonly fail in fatigue, under rotational cyclic loading.
3. The coupling is shortened to allow abutment of the two pins at the center of the coupling maximizing the torque capabilities of the connection.
4. The coupling can be formed with an integral, sacrificial wear-sleeve extension, protecting the coupling proper from frictional wear as the casing is rotated down the well bore.

BRIEF DESCRIPTION OF THE SEVERAL VIEWS OF THE DRAWING(S)

FIG. 1 is a side view, partially in cross-section, of two pipes joined with a coupling of the prior art.

FIG. 2 is a side view, partially in cross-section, of two pipes joined with a prior art coupling having a center section of increased thickness.

DETAILED DESCRIPTION OF THE INVENTION

Casing Couplings of the Prior Art

Figures 3, 4, 4A:
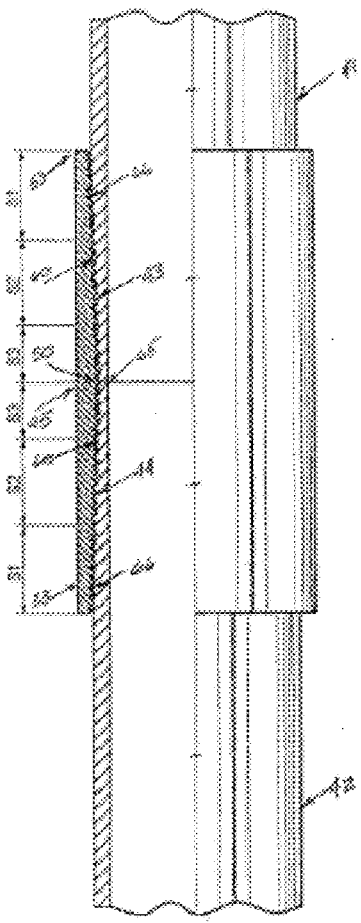
FIG. 3 is a side view, partially in cross-section, of two pipes joined with a coupling according to the present invention.
FIG. 4 is a side view, partially in cross-section, of two pipes joined using an alternative embodiment of the present invention.
FIG. 4A is an enlarged view of the leading edge portion of the wear sleeve.

Referring now to the drawing in FIG. 1, a standard API Buttress Threaded casing string 10 and coupling 15 according to the prior art is illustrated. The casing string 10 includes two casing sections, or pipes, 11 and 12, having pin ends 11A and 12A, interconnected with a coupling 15 according to the prior art. FIG. 1 shows the connection fully assembled. Note the separation between pin ends 11A and 12A. This gap between the pins is commonly known as the "J" area.

Still referring to FIG. 1, the casing members 11 and 12 include pin threads 13 and 14 on the outside end of each casing section, the threads mating with the threaded internal surface of the coupling 15. The coupling 15 includes a first end 18 and a second end 19 with internal threaded surfaces 16 and 17. The threads are preferably tapered API Buttress threads as are commonly used in the industry and in this application. However, other thread forms may be used.

Now referring to FIG. 2, which shows another oil well casing connection in accordance with U.S. Pat. No. 5,015,017, a casing string is illustrated generally at 20. The casing string 20 includes two casing sections 21 and 22 interconnected with coupling 25, and the casing sections include external API Buttress pin threads 23 and 24 which mate with matching coupling threads 26 and 27.

Essentially FIG. 2 is the same as FIG. 1 with the exception that the "J" area between pin ends 23 & 24 contains an integral reinforcing cross-section 30 of the coupling 25. This heavy cross-section 30 substantially improves the strength of the coupling by converting the structural/mechanical behavior of the coupling from a simple beam to a cantilever beam. The visual contrast is readily noted by comparing the cross-sections of coupling 15 (FIG. 1) and coupling 25 (FIG. 2). Both connections preferably use the Standard API Buttress threads and are interchangeable with each other.

Casing Couplings According to the Present Invention

With reference to FIG. 3 and this invention, a casing string is illustrated with two casing sections 41 and 42 interconnected with coupling 45 and the casing sections include externally threaded pins 43 and 44, which mate with internal coupling threads 60. Threaded pins 43 and 44 contain standard API Buttress Threads with a constant taper. The faces of the two pin ends 65 are square cut to furnish maximum bearing face when butted together at center 50 of coupling 45.

Again referring to FIG. 3 and this invention, it is standard with the API Buttress Thread Form for the coupling threads 60 and pin threads 43, 44 to have identical thread tapers so as to produce uniform radial thread interference through the full length of the thread profile. When the connection is assembled, it is this thread interference that creates the contact pressure and therefore the sealing capabilities of the mating threads.

It will be further noted in FIG. 3 that the thread tapers of the pin and coupling members result in variable cross-sections along the thread profile of each member, with a thinner cross-section at pin ends 65 and similar thinning cross-sections at coupling ends 53. When the connection is assembled it is seen that the thinner cross-sections of the respective pin and coupling members are opposite the heavier cross-sections of the mating member. The cross-sections therefore are unbalanced at the thinner ends of both members. When the connection is assembled, it is this imbalance between these cross-sections and the resulting excessive hoop stresses in the thinner cross-sections, that this invention addresses.

Referring again to FIG. 3, it is evident that a uniform taper between the pin and coupling threads results in uniform interference along the thread profile. However, as pointed out above, the cross-sections of the mating members vary along the thread profile. Therefore, if the interference between the threads is uniform, but the cross-sections behind the threads are variable, then the resulting hoop stresses created in the cross-sections must also be variable; graduating from low stresses in the thicker part of the cross-section to high stresses in the thinner part. Indeed it has been found through Finite Element Analysis (FEA) that, after assembly, the hoop stresses in the thinner cross-sections of both the pins and coupling can exceed the yield strength of the steel. In addition to the negative impact on the yield strength, in the thinner portions of the mating members this differential yielding at the thin vs. thick cross-sections also causes differential movement between the threads at these same high stress points. This differential movement, at the high stress points, in turn results in thread galling in both coupling and pins at 65 and 66. It is also anticipated that these same high stressed areas, particularly at the run-out threads 66 of the pin members 43 and 44, could result in fatigue failure when the connections are used in the drilling mode (DWC).

Referring again to FIG. 3. there is shown a cross-sectional view of a shortened API Buttress Threaded coupling 45 connecting two Buttress Threaded Pins 43 and 44 that abut at the center of the coupling 45. FIG. 3 illustrates this shortened and multiple tapered coupling designed to:

1) Moderate the concentrated high stresses previously outlined
2) Minimize the thread galling in the areas of high stress
3) Maintain compatibility with standard API Buttress threaded pin members
4) Create a high torque connection by butting the pin ends at the center of the coupling To accomplish these objectives the thread tapers in only the coupling member 45 are modified at the areas of high stress; i.e., the areas of cross-sectional imbalances at coupling ends 53 and pin ends 65. As shown in FIG. 3 the thread taper in coupling 45 is segmented into sections S1, S2 and S3. In the present invention the taper in section S2 is maintained at the API standard taper. The taper in section S1 is greater than the taper in section S2, and the taper in section S2 is greater than the taper in section S3. The variable tapers in coupling 45 relative to the uniform tapers of pins 43 and 44 reduce bearing pressures in the mating thread elements in areas of the connection with unbalanced cross-sections; i.e. 65 on the pin ends and 53 of the coupling ends. The employment of multiple tapers reduces the contact pressure in the overstressed areas S1 and S3 and thus mitigates the problems of high stresses, thread galling and fatigue failure.

In one preferred embodiment, the threaded section on each side of a 7-inch API Buttress coupling is divided into three sections as previously described. The lengths and tapers for each section in this preferred embodiment are:

| Section | Length (in) | Taper (in./in.) |
|---|---|---|
| 1 | 1.784 | 0.07525 |
| 2 | 1.716 | 0.06250 |
| 3 | 1.125 | 0.05556 |

The section lengths and tapers employed in this invention are designed to reduce contact pressure in areas of the connection where cross-sections are unbalanced.

It might be noted that other taper profiles, such as elliptical or curved, might be used, but the segmented profile is preferred because it maximizes the length of section S2 which has the same taper on both members therefore maximizing sealing integrity. It is emphasized that only the coupling tapers need be modified.

It is also emphasized that the pin threads 43 and 44 should be made to standard API Buttress specifications with no modifications to length or taper. This allows the casing pipes to be threaded by the many API licensed machine shops or mills in the world. By contrast there are only a few coupling manufacturers in the world and most have the modern equipment to machine the modifications required by this invention. Also couplings are easily transportable as opposed to 40' lengths of pipe.

Again in FIG. 3, the coupling is shortened by approximately ¾ inch, removing what is commonly known as the "J" area between the two pin members as previously pointed out in FIG. 1. In this invention, elimination of the "J" area allows the two pins to butt one another at the coupling center thereby maximizing the torque capabilities of the connection and its use for DWC.

Now referring to FIG. 4, an optional unthreaded extension 70 can be integrally machined on one end of the coupling 55. The purpose of the extension is to provide a sacrificial wear sleeve to protect the main body of the coupling as the casing is rotated down the well bore. The wear sleeve would have the same outside diameter as the coupling with the inside diameter being slightly larger than the casing so as to slip over the casing when the connection is assembled. As an option, the wear sleeve can be hard banded if excessive abrasion is anticipated.

Again at FIG. 4 the inside diameter of the wear sleeve is uniform from the face 72 for a specific distance toward the center of the coupling, then is tapered outward toward the coupling OD 73. This design detail is provided to permit the threading tool to cut perfect (full-formed) threads over the entire coupling thread length without cutting into the ID of the sacrificial wear sleeve. Elimination of machining marks in the wear sleeve near the coupling threads reduces the possibility of fatigue failures in the sacrificial wear sleeve extension.

Figure 5:
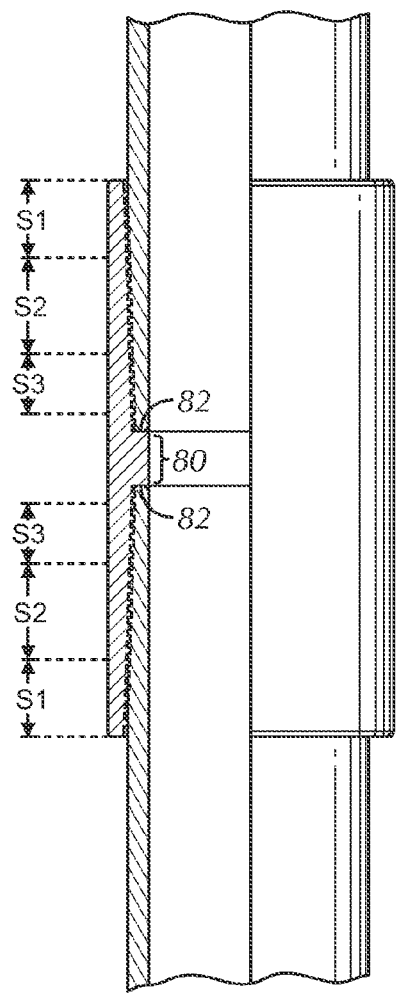
FIG. 5 is a side view, partially in cross-section, of two pipes joined using a third embodiment of the present invention.
Figure 6:
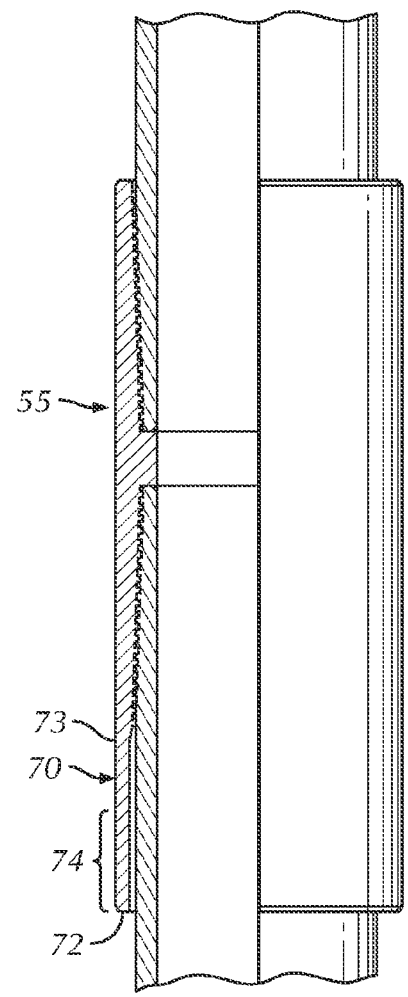
FIG. 6 is a side view, partially in cross-section, of two pipes joined using a fourth embodiment of the present invention.

In an alternative embodiment illustrated in FIGS. 5 and 6, an API Buttress coupling has an internal reinforcing cross-section 80 at the center or in the "J" area. In this embodiment, each pin engages an internal square shoulder 82 at the heavy cross-section thereby maximizing the torque capability of the connection for its use for DWC.

As in the embodiment shown in FIG. 4, an optional unthreaded extension 70 can be integrally machined on one end of the coupling 55. This feature is illustrated in FIG. 6. The purpose of the extension 70 is to provide a sacrificial wear sleeve to protect the main body of the coupling as the casing is rotated down the well bore. The wear sleeve would have the same outside diameter as the coupling with the inside diameter being slightly larger than the casing so as to slip over the casing when the connection is assembled. As an option, the wear sleeve can be hard banded in area 74 if excessive abrasion is anticipated.

Again, as in the embodiment shown in FIG. 4, the inside diameter of the wear sleeve is uniform from the face 72 for a specific distance toward the center of the coupling, then is tapered outward toward the coupling OD 73. This design detail is provided to permit the threading tool to cut perfect (full-formed) threads over the entire coupling thread length without cutting into the ID of the sacrificial wear sleeve. Elimination of machining marks in the wear sleeve near the coupling threads reduces the possibility of fatigue failures in the sacrificial wear sleeve extension.

It should be noted and anticipated that certain changes may be made in the present invention without departing from the overall concept described here and it is intended that all matter contained in the foregoing shall be interpreted as illustrative rather than in a limiting sense.

What is claimed is:

1. A coupling for threaded tubular goods used for well drilling and having a first end and an opposing second end comprising a sacrificial wear sleeve integral with the second end of the coupling body, the sacrificial wear sleeve comprising an unthreaded, distal portion of the coupling which portion comprises an outer, generally cylindrical wall, an inner, generally cylindrical wall and an end surface between the inner wall and the outer wall that is generally orthogonal to both the outer wall and the inner wall with the end surface and at least the portion of the outer wall adjacent to the end surface having additional wear protection. cylindrical wall and an end surface between the inner wall and the outer wall and the inner wall with the end surface and at least the portion of the outer wall adjacent to the end surface having additional wear protection.

2. A coupling as recited in claim 1 wherein the additional wear protection is hard banding.

3. A coupling as recited in claim 1 wherein the wear sleeve comprises a first portion having a lesser wall thickness and a second portion, distal to the first portion, having a greater wall thickness.

4. A coupling as recited in claim 3 wherein the outer diameter of the wear sleeve is substantially constant and the inner diameter of at least a portion of the wear sleeve varies with distance from the end of the coupling.

\* \* \* \* \*